United States Patent [19]

Vuichard et al.

[11] Patent Number: 5,016,110

[45] Date of Patent: May 14, 1991

[54] AUTOMATIC FOCUSING CONTROL OF A VIDEO CAMERA FOR INDUSTRIAL AND MILITARY PURPOSES

[75] Inventors: Albin Vuichard, Mollis; Bruno Bühler, Stadel; Tell Cavin, Uster, all of Switzerland

[73] Assignee: Oerlikon-Contraves AG, Zurich, Switzerland

[21] Appl. No.: 380,970

[22] Filed: Jul. 17, 1989

[30] Foreign Application Priority Data

Jul. 28, 1988 [CH] Switzerland ......................... 02859/88

[51] Int. Cl.$^5$ ............................................ H04N 5/232
[52] U.S. Cl. ................................................... 358/227
[58] Field of Search ....................... 358/227, 228, 209; 354/402, 406, 407

[56] References Cited

U.S. PATENT DOCUMENTS 4,609,944 9/1986 Nakada et al. ....................... 358/227
4,660,092 4/1988 Nutting ................................. 358/224

FOREIGN PATENT DOCUMENTS 0263510 4/1988 European Pat. Off. .

OTHER PUBLICATIONS

I. Plander, "Trends in the Development of Sensor Systems and Their Use in Some Technological Areas", published in ROBOTICS, vol. 3, No. 2, pp. 157 to 165, published by Elsevier Science publishers, B.V. Amsterdam, Jun. 1987.

Research Disclosure entitled "Brightness-Dependent Focusing Aid for a Manually Focused Video Camera", published in Research Disclosure, No. 288, pp. 215 to 217, Apr. 1988.

Primary Examiner—Stephen Brinich
Attorney, Agent, or Firm—Sandler, Greenblum, & Bernstein

[57] ABSTRACT

A video camera is used for controlling the adjustment of a manipulator unit. An object is imaged by the video camera which is optimumly focused with respect to the object as a function of the mean brightness of a predetermined image from containing the image of the object. The focusing operation is carried out on the basis of obtaining an optimum value for the mean brightness of the image elements within the predetermined image frame enclosing the object image. The manipulator unit may contain an industrial robot for selectively adjusting either one of a workpiece or a tool acting upon a workpiece. Furthermore, the manipulator unit may contain a target tracking platform for tracking a target constituting the object imaged by the video camera.

24 Claims, 3 Drawing Sheets

AUTOMATIC FOCUSING CONTROL OF A VIDEO CAMERA FOR INDUSTRIAL AND MILITARY PURPOSES

CROSS-REFERENCE TO RELATED APPLICATION

This application is related to the commonly assigned, co-pending U.S. application Ser. No. 07/382,111, filed July 19, 1989, entitled "AUTOMATIC BRIGHTNESS AND CONTRAST CONTROL FOR A VIDEO CAMERA USED FOR INDUSTRIAL AND MILITARY PURPOSES". The disclosure of this application is incorporated herein by reference.

BACKGROUND OF THE INVENTION

The present invention relates to a new and improved construction of an apparatus for, and a method of, automatically and passively focusing a video camera with respect to a predeterminate object.

The present invention thus generally relates to the fields of optics and electronics and, specifically, to the field of image processing techniques. In its more particular aspects, the present invention specifically relates to a new and improved construction of an apparatus for, and a method of, automatically and passively focusing a video camera with respect to a predeterminate object and for producing an optimumly focused image of the predeterminate object in order to use such video image for controlling the operation of a manipulator unit. In this manner the video camera can be used for monitoring the operation of an industrial robot which constitutes the manipulator unit or an essential part thereof. The video camera may also be used for controlling the operation of a manipulator unit which constitutes or comprises an automatic target tracking unit or device and thus serves or cooperates with a so-called videotracker contained therein. In both areas or fields of use the video camera may constitute a FLIR camera, i.e. a forward looking infrared camera which responds to heat radiation received thereby.

Means for automatically focusing the image in connection with a camera are well-known. Generally, a differentiation is made between active and passive focusing means and methods.

A first known method relies upon a signal, e.g. an ultrasonic or infrared beam of rays which is emitted by the camera. The ultrasonic or infrared radiation reflected by the object to be imaged is received and generates a signal which is utilized for focusing the camera with respect to such object. When using ultrasonic radiation, the time difference between the emission of the signal and the reception of the echo signal reflected by the object can be used for determining the distance of the object from the camera. When relying upon infrared radiation, the reflected signal is received by means of a photodiode which is positioned laterally of the transmitter at the camera and the distance of the object is determined from a parallax angle. The focus adjustment is then carried out on the basis of the functional relationship between the distance of the object and the distance of the associated image.

Such known methods thus rely upon an active distance measurement which is well suited for the non-professional field and can be realized using apparatus of relatively limited complexity. For industrial uses, however, problems may occur due to the presence of interfering sources which cause an interference or disturbance in the reflected radiation originating from the object. Furthermore, for military purposes, any active target measurement or tracking is out of question a priori for camouflage reasons.

A second known method derives data concerning the focusing condition directly from the received image on the basis of a predetermined criterion. The adjustment of the lens system is corrected until an optimum adjustment is achieved which corresponds to the predetermined focusing criterion.

From the point of view of optical imaging theory it would be obvious to base the focusing criterion upon the so-called space-frequency analysis or spatial filtering. Such analysis relies upon a distinct property of convex lenses, namely the property of transforming into the Fourier transform an image which is illuminated by monochromatic and parallel as well as temporally and spatially coherent radiation. This Fourier transform, the so-called space-frequency image is positioned in the focal plane of the imaging lens and corresponds to a frequency analysis of the illuminated image structure. Coarse structures of the image, i.e. coarse structures in the imaged object result in low space or spatial frequencies and fine structures of the image, i.e. fine structures in the imaged object, result in high space or spatial frequencies. The latter high space or spatial frequencies are only present in a well-focused image since such fine structures are only reproduced in a sharp image. The appearance of high space or spatial frequencies thus is a useful criterion for optimum focusing of the lens or lens system. In practice, however, the use of such method is fraught with difficulties since, on the one hand, white light, i.e. non-monochromatic and non-coherent radiation is nearly always used for illuminating the object so that there occurs an intermixing of the higher space or spatial frequencies and, on the other hand, the measurement of the light intensity distribution in the focal plane must be carried out at very high precision.

Frequently, therefore, the focusing of photo cameras is carried out on the basis of other criteria. For example, the image section or frame which is to be focused, can be imaged through two lenses onto an image sensor comprising a chain or sequence of charge-coupled devices. The position of the focus with respect to the image plane is determined from the distance between the two image structures corresponding to the two imaging lenses. More detailed information on such systems are available from the data sheets of related photo cameras.

When using cameras employing electronic image recording such as, for example, video cameras, the already mentioned image analyses by means of charge-coupled devices are very frequently utilized. The reason therefor is that the other aforementioned active methods which are based on ultrasonic or infrared radiation, are afflicted with insufficient reliability. The interfering effects produced by glass plates and inclined surfaces at the object to be imaged, upon reflected infrared radiation are here specifically mentioned.

Automatic focusing means in connection with cameras for non-industrial uses are primarily to be considered as facilitating the operation of such cameras in terms of increasing the operator comfort but otherwise there can hardly be attributed thereto any positive significance. The situation, however, is different with respect to cameras which are utilized in the industrial field, for example, in connection with robot equipment or in the event of use for military purposes. In such cases the operator simply cannot be expected to be charged with the task of focusing. One reason therefore is that other tasks have priority and another reason can be that, in the event of rapidly moving objects, the operator does not have enough time at his disposal for readjusting the focusing. Therefore, efforts for automating the focusing operation are more than merely desirable. Still, hitherto no means or methods have become known for solving this problem in a fully satisfying manner.

An important requirement for any focusing means or method is the recognition of the object with respect to which the focusing operation must be carried out relative to the background which is tolerated to be imaged out of focus. This problem is without significance with respect to non-industrial or non-military uses because in those fields the image area to be focused is determined by the operator by means of the view finder.

It is quite conceivable that, in the video camera image of an industrial robot, the movable object like, for example, a workpiece or a tool operating upon a workpiece, can be hardly recognized or not at all relative to the background for certain periods of time. This problem is particularly encountered in the case of military targets which move across a continuously changing background. In such cases the object recognition has great significance. The object recognition, however, will not be discussed in detail herein because the object recognition requires optimization of brightness and contrast in the video image and this is the subject of the initially mentioned and cross-referenced, commonly assigned and copending United States application.

SUMMARY OF THE INVENTION

Therefore, with the foregoing in mind, it is a primary object of the present invention to provide a new and improved construction of an apparatus for, and a method of, automatically and passively focusing a video camera with respect to a predeterminate object and which apparatus and method are not afflicted with the drawbacks and limitations of the prior art heretofore discussed.

Another and more specific object of the present invention is directed to the provision of a new and improved construction of an apparatus for, and a method of, automatically and passively focusing a video camera with respect to a predeterminate object and which apparatus and method permit continuously providing an optimumly focused image of the predeterminate object.

Still a further significant object of the present invention is directed to a new and improved construction of an apparatus for, and a method of, automatically and passively focusing a video camera with respect to a predeterminate object and which apparatus and method permit reliably controlling the operation of an industrial robot.

A still further important object of the present invention is directed to the provision of a new and improved construction of an apparatus for, and a method of, automatically and passively focusing a video camera with respect to a predeterminate object and which apparatus and method permit reliably tracking a target.

Now in order to implement these and still further objects of the invention, which will become more readily apparent as the description proceeds, the apparatus of the present development is manifested, among other things, by the features that, a manipulator unit is connected with computer means and an image control unit is connected with the computer means and the video camera. A focus control unit may be interconnected between the image control unit and the video camera. The image control unit measures the mean brightness of the image elements or pixels of the video image within a predetermined image section or frame encompassing the image of the object to be imaged. The image control unit is connected to the video camera for transmitting thereto focusing control signals which are correlated to the mean brightness of the image elements or pixels in the predetermined image section or frame which encompasses the object image.

As alluded to above, the invention is not only concerned with the aforementioned apparatus aspects, but also relates to a new and improved method carried out by means of such apparatus. Generally speaking, the inventive method is directed to automatically and passively focusing a video camera with respect to a predeterminate object.

To achieve the aforementioned measures, the inventive method, in its more specific aspects, comprises the following steps:

fading-in into the imaging area of the video camera, a predetermined image section or frame containing the image of the object to be imaged;

determining the mean brightness of the video image within the predetermined image section or frame; and controlling the focusing operation of the video camera as a function of the mean brightness of the predetermined image section or frame.

The inventive apparatus and the inventive method thus rely upon a real-time image evaluation process for automatically carrying out the passive focusing operation. Such real-time image evaluation is based upon measuring the mean value of the brightness or light intensity within a limited or predetermined field of view or predetermined image section or frame and adjusting the focus of the video camera such that the mean brightness or light intensity assumes an extreme value.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various FIGURES of the drawings, there have been generally used the same reference characters to denote the same or analogous components and wherein.

DETAILED DESCRIPTION OF THE PREFERRED EMBODIMENTS

Describing now the drawings, it is to be understood that only enough of the construction of the apparatus has been shown as needed for those skilled in the art to readily understand the underlying principles and concepts of the present development, while simplifying the showing of the drawings. Turning attention now specifically to FIG. 1 of the drawings, the apparatus illustrated therein by way of example and not limitation in a schematic block circuit diagram, will be seen to comprise an apparatus for monitoring an automatically controllable manipulator unit 2 for industrial use in connection with, for example, an industrial robot 21 or a fully automatically controlled machine tool. A video camera 1 monitors the grasping and manipulation of an object 7 which may constitute, for example, a workpiece 71 which is grasped and manipulated by the industrial robot 21, or a tool 72 of a machine tool operating upon a workpiece.

Figure 1:
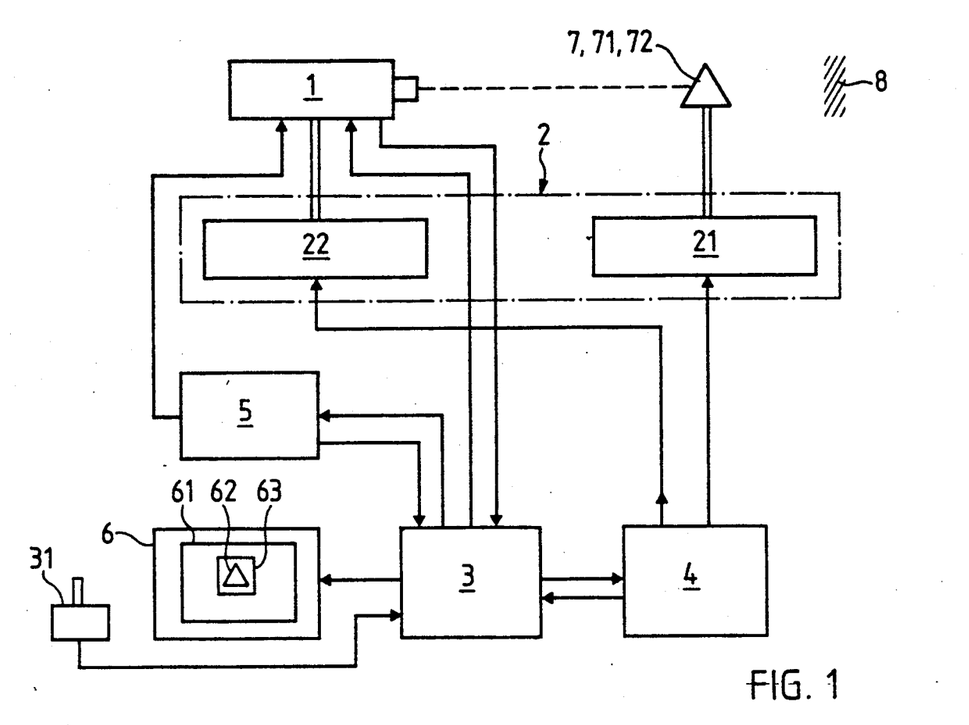
FIG. 1 is a schematic block circuit diagram of a first exemplary embodiment of an apparatus for carrying out a first exemplary embodiment of the inventive method for controlling the operation of an industrial robot by means of a video camera cooperating with an image control unit and focusing means for focusing the video camera with respect to the object to be imaged.

The inventive apparatus schematically illustrated in FIG. 1, essentially comprises the aforementioned video camera 1 which images the object 7, and an image control unit 3 receiving digital electrical signals representative of the image data produced by the video camera 1. Such digital electrical signals are obtained by A/D conversion of analog signals which are produced as a result of the imaging process by the video camera 1. The image control unit 3 evaluates the received image data and generates control signals for optimum operation of the video camera 1 and transmits such control signals either directly or indirectly via a focus control unit 5. The processed image data which are generated by the image control unit 3, are received by a main computer or computer means 4 which converts or transforms the image data into control signals. Such control signals generated by the main computer or computer means 4 are translated into a sequence of movements of the controlled manipulator unit 2, for example, by using a suitable servo system. Additionally, the main computer or computer means 4 controls the entire adjusting movement of the apparatus including, for example, the movements of a platform 22 which may constitute part of the manipulator unit 2. The platform 22 is mechanically rigidly connected to the video camera 1 and thus permits the video camera 1 to track the object 7.

A monitor 6 is connected to the image control unit 3 and permits visually monitoring the object 7. Manipulator means 31 are also provided and connected to the image control unit 3 for manually allocating the video camera 1 to a predeterminate object 7.

The image control unit 3, the optional focus control unit 5 and the main computer or computer means 4, for example, may be assembled to form a structural unit.

Figure 2:
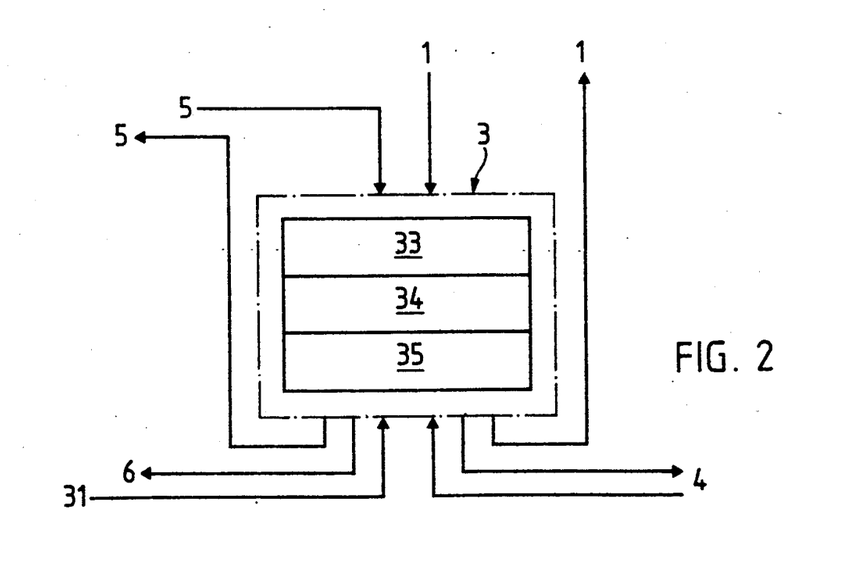
FIG. 2 is a block circuit diagram showing the main components and connections of the image control unit in the apparatus illustrated in FIG. 1.

The constructional principle of the image control unit 3 and its main connections are illustrated in FIG. 2. The image control unit 3 comprises an image evaluating unit 33, an object brightness or gain/offset control or control unit 34 and an I/O processor 35.

The video camera 1 produces video analog signals which are first digitized by means of an A/D converter, i.e. converted into digit sequences or digital data representative of the brightness of the individual image elements or pixels in the imaging area of the video camera 1. The digital image data are subsequently supplied to the image evaluating unit 33 of the image control unit 3. This image evaluating unit 33 interprets the digitized video signal. In order to differentiate between the object 7 and the background 8, a so-called gray-scale histogram analysis is carried out in the object brightness or gain/offset control 34. The object brightness or gain/offset control 34 generates brightness related control signals which act upon the video camera 1 via the I/O processor 35 in a manner such that the image of the object 7 is differentiated as distinctly as possible from the background 8 with respect to its brightness. The details of the method and apparatus for such brightness control are more fully described in the initially mentioned and cross-referenced, commonly assigned and co-pending United States Application and the contents of this application is incorporated herein by reference.

Figure 3A:
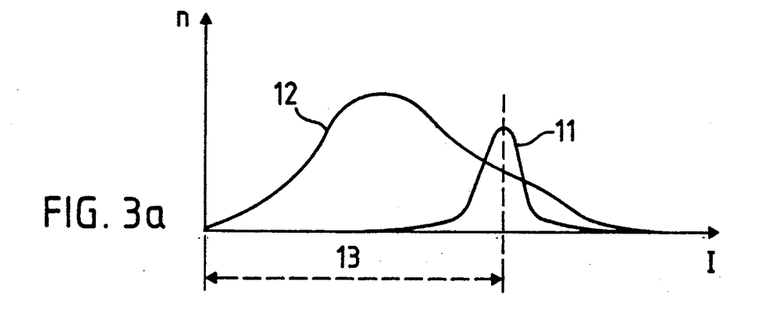
FIG. 3a and FIG. 3b respectively illustrate the brightness or intensity distribution along one coordinate of the imaging area of the video camera shown in FIG. 1 prior to and after focusing the video camera with respect to the object to be imaged.
Figure 3B:
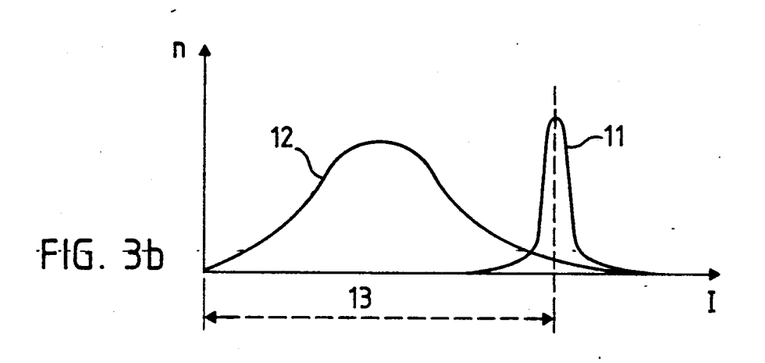

The focusing of the video camera 1 which is the subject of the instant application, is controlled by means of the image control unit 3 via the focus control unit 5. This focusing operation will now be described with reference to the general apparatus illustration in FIG. 1 and the local image brightness distribution as illustrated in FIGS. 3a and 3b.

As already mentioned hereinbefore, only a passive focusing operation is considered for focusing the video camera 1 with respect to the intended use of the video camera 1.

The present invention is based upon the idea of using the mean brightness 13 of a predetermined image section or frame of the total video image 61 as a measure of the focusing state or condition of the video camera 1 with respect to the object 7. This predetermined image section or frame of the total video image 61 is defined by the predetermined image section or frame 63 encompassing or including the image 62 of the object 7.

The predetermined image section or frame 63 is adjusted, for example, by the operator using the manipulator means 31 which preferably are constructed in the manner of a joy stick control. The manipulator means 31 permit the operator to selectively adjust either one or both of the position and the size of the predetermined image section or frame 63. It is the task of the operator to adjust the predetermined image section or frame 63 such as to be as small as possible but sufficiently large to encompass or include the total image 62 of the object 7. Instead or in addition to the manual adjustment of the predetermined image section or frame 63, it is also possible to automatically adjust the predetermined image section or frame 63 by means of the image control unit 3 which serves the task of recognizing or detecting and optimumly imaging the object 7 in any event.

The mean brightness 13 results from an averaging operation on the brightness measured at all of the individual image elements or pixels which are present within the predetermined image section or frame 63. Such determination of the mean brightness can be carried out via the aforementioned gray-scale histograms; the generation of such gray-scale histograms and their evaluation is known in the art and may be carried out substantially in the manner as described, for example, in U.S. Pat. No. 4,613,269, granted Sept. 23, 1986.

The focusing principle which relies upon optimizing the mean brightness 13 of the image elements or pixels which are associated with the object 7 and which are within the predetermined image section or frame 63, is apparent from FIGS. 3a and 3b. In a poorly focused condition, as illustrated in FIG. 3a, the brightness distribution 11 of the image 62 of the object 7 is only poorly differentiated from the brightness distribution 12 of the image of the associated background 8. This is due to the fact that the image 62 of the object 7 is not precisely limited as a result of the lack of focus and thus the brightness or light intensity associated with the image elements or pixels of the object image is transferred to the image elements or pixels in the environment of the image 62 of the object 7, i.e. to the image elements or pixels of the associated background 8. Under well focused conditions such as illustrated in FIG. 3b, the brightness or intensity of the image 62 of the object 7, is concentrated on the image elements or pixels present within the sharp or distinctly bounded contour of the object image 62. Consequently, the mean brightness 13 associated with the image elements or pixels of the object image 62 assumes an extreme value upon focusing. Such extreme value may constitute a brightness maximum or a brightness minimum depending upon whether the brightness of the object image 62 is greater or smaller than the brightness of the background image. Concomitantly therewith, also the mean brightness 13 associated with the predetermined image section or frame 63 which encompasses or includes the object image 62, assumes a corresponding extreme value.

It should be noted that during a change in the focus, there is also produced a change in brightness distribution 12 associated with the background 8. However, the focusing operation is carried out with respect to the object 7 and not with respect to the background 8 so that the effect of a focus change is negligibly small upon the brightness distribution 12 associated with the background 8.

The aforedescribed focusing operation is realized by means of a digital control method. The control signals generated by the image control unit 3 are supplied to focusing means 1A of the video camera 1 in order to carry out the desired focusing operation. Such focusing means 1A may contain, for example, a driver circuit receiving the control signals and acting upon a drive motor which is drivingly connected with an adjustable lens system of the video camera 1. Such focusing means 1A for controlling and adjusting the lens system of a video camera are conventional and known, for example, from European Published Patent Application No. 0,263,510, published Apr. 13, 1988.

It is also conceivable in principle that the focussing control and, if desired, also the image brightness control is not carried out in digital manner but by directly processing the analog video signals which are produced by the video camera 1. This possible mode of operation would be advantageous if the automatic focusing control is integrated into the video camera 1.

It is a precondition for the aforementioned focusing operation that already at the start of such focusing operation, the object 7 is differentiated as distinctly as possible from the associated background 8 by correspondingly adjusting the brightness and the contrast by means of the gain/offset-control of the video camera 1. During such gain/offset-control of the video camera 1 the image of the object 7 and the image of the associated background 8 are not adjusted in an optimum manner in adaptation to the eye of the operator viewing the screen 61 of the monitor 6. The adjustment, in fact, is optimized with the view of optimum automatic recognition or detection of the object 7 by the video camera 1.

During the actual focusing operation, the gain/offset control of the video camera 1 should not be manipulated because otherwise there is the danger of interference between the two control systems, namely the focusing control and the gain/offset control. In this context, reference is again made to the initially mentioned and cross-referenced, commonly assigned and co-pending United States application which is specifically directed to the optimum adjustment of the brightness and contrast of the object image produced by the video camera 1.

Figure 4:
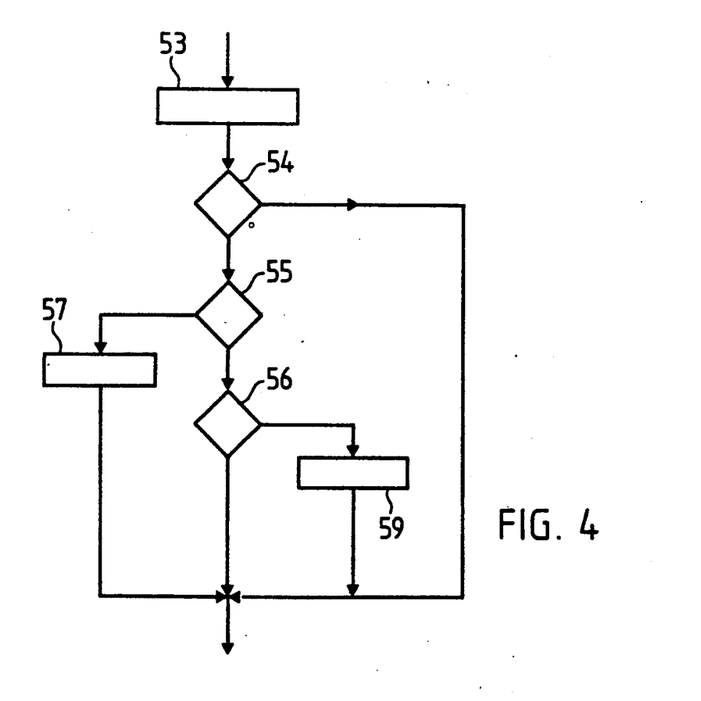
FIG. 4 is a schematic flow diagram illustrating the data flow in the apparatus shown in FIG. 1 during a focusing operation.

The chronological course of the focusing operation will now be described with reference to FIG. 4. During the focusing operation, a command generator 53 generates input data which are varied in periodical sequence and take account of the movement of the object 7 relative to the video camera 1. The presence of such input data is checked at a test point 54. In the absence of such input data, there is departed from the focusing cycle.

In the presence of such input data, there is checked at a test point 55 whether the direction of the focusing adjustment for achieving improved focusing has already been found. If the focus-improving direction has not yet been found, there is investigated by means of a direction finder 57 and by introducing small changes in the focusing data whether the input data supplied by the command generator 53 result in an improvement of the focus adjustment in terms of the aforedescribed focus criterion. If such is the case, then, there is directly departed from the focusing cycle. If the input data originating from the command generator 53 do not result in a focusing improvement, the command generator 53 is re-adjusted in correspondence therewith. Since in this manner the data resulting in focus improvement have been found, the test point 55 can be directly passed in the next-following cycle of the focusing operation.

Furthermore, at a test point 56 there is checked whether the focusing quality has changed with respect to the focusing quality obtained during the preceding cycle of the focusing operation, specifically whether there has been obtained a substantial change, i.e. a change by an amount which is outside of a predetermined limiting or threshold value. If such is not the case, a corresponding indication is produced by the focus stop 59 and the focusing operation is terminated. Otherwise, there is directly departed from the focusing cycle.

The image evaluating unit 33 of the image control unit 3 communicates to the I/O processor 35, in addition to the mean brightness 13 of the predetermined image section or frame 63, data related to the position of the object image 62 within the imaging area of the video camera 1. These data are supplied to the main computer or computer means 4 which controls the movements of the industrial robot 21 as a function of such positional data relating to the position of the object image 62 within the imaging area of the video camera 1. In addition it may prove necessary that the video camera 1 tracks the object 7. For this purpose the video camera 1 is mounted on the platform 22 and this platform 22 is adjusted by means of control signals produced by the main computer or computer means 4.

Figure 5:
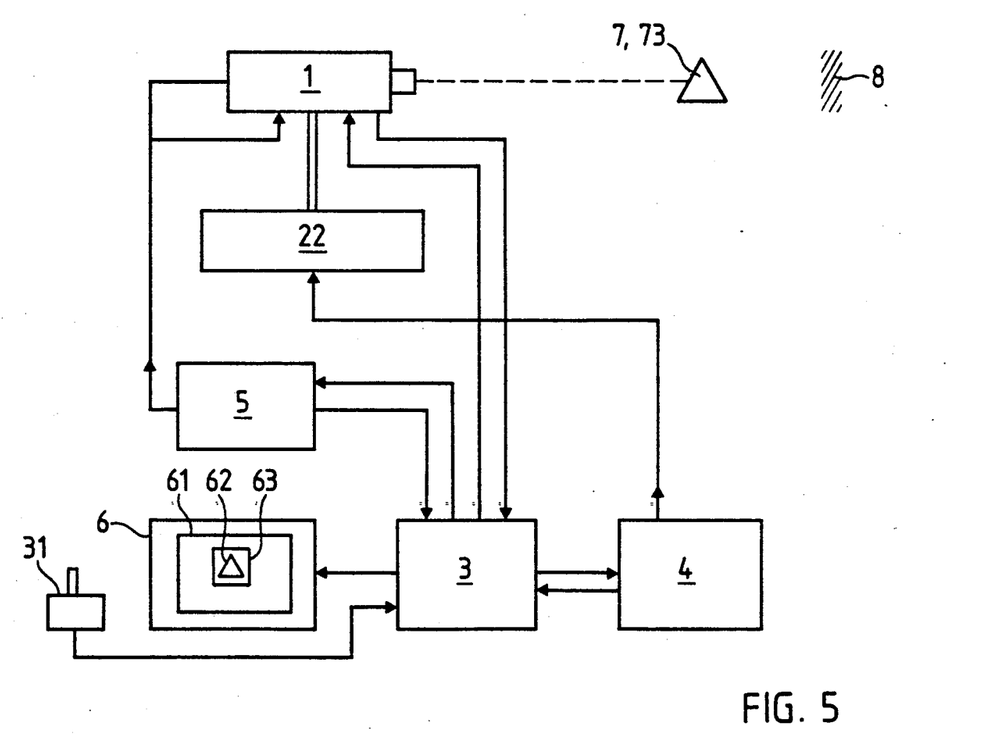
FIG. 5 is a schematic block circuit diagram showing a second exemplary embodiment of the inventive apparatus for carrying out a second exemplary embodiment of the inventive method for tracking a military target.

A second exemplary embodiment of the inventive apparatus is illustrated in FIG. 5 which also illustrates a second exemplary embodiment of the inventive method directed to target tracking. In this exemplary embodiment, the object 7 constitutes a target 73 which is tracked by means of the video camera 1. The video camera 1 is mounted on an adjustable platform 22 which is adjustable in azimuthal direction and in elevation. The video camera 1 is mechanically rigidly connected to the platform 22 and may be constructed, for example, as a FLIR camera, i.e. a forward looking infrared camera. The afore-described image control unit 3 is also present in this embodiment of the inventive apparatus and monitors the operation of the video camera 1 as well as, with the assistance of the main computer or computer means 4, the position of the platform 22 as a function of the video signals produced by the video camera or target tracking video camera 1. The monitor 6 which is connected to the image control unit 3, permits the operator to visually track the target 73.

While there are shown and described present preferred embodiments of the invention, it is to be distinctly understood that the invention is not limited thereto, but may be otherwise variously embodied and practiced within the scope of the following claims.

Accordingly, What we claim is:

1. An apparatus for automatically and passively focusing a video camera with respect to a predeterminate object comprising;
    a video camera for producing an image of an area containing the predeterminate object;
    an image control unit connected to said video camera;
    said image control unit receiving data representative of a predetermined image frame of said image produced by said video camera and which predetermined image frame mainly contains an image of said predeterminate object;
    said image control unit determining the mean brightness of said predetermined image frame;
    a focus control unit interconnected between said image control unit and said video camera; and
    said focus control unit controlling a focusing operation at said video camera with respect to said predeterminate object in response to control signals received from said image control unit as a function of said mean brightness of said predetermined image frame.

2. The apparatus as defined in claim 1, wherein:
    said image control unit determines, during a focusing operation, an extreme value of said mean brightness of said predetermined image frame and thereby focuses said video camera with respect to said predeterminate object.

3. The apparatus as defined in claim 1, further including:
    frame control means connected with said image control unit for adjusting said predetermined image frame mainly containing said image of said predeterminate object.

4. The apparatus as defined in claim 3, further including:
    a monitor connected to said image control unit; and
    said monitor permitting visual observation of the operation of said frame control means.

5. The apparatus as defined in claim 3, wherein:
    said frame control means constitute manipulator means; and
    said manipulator means permitting manual adjustment of said frame control means for adjusting said predetermined image frame.

6. The apparatus as defined in claim 5, wherein:
    said manipulator means are manually adjustable for adjusting said predetermined image frame selectively with respect to either one of both of (i) the position and (ii) the size of said predetermined image frame.

7. The apparatus as defined in claim 3, wherein:
    said frame control means constitute automatic frame control means incorporated into said image control unit; and
    said frame control means are automatically adjustable for adjusting said predetermined image frame selectively with respect to either one or both of (i) the position and (ii) the size of said predetermined image frame.

8. The apparatus as defined in claim 1, further including:
    focusing means provided at said video camera;
    said focusing means being connected with said focus control unit; and
    said focus control unit driving said focusing means as long as said mean brightness of said predetermined image frame does not remain constant within a predetermined threshold value during further operation of said focusing means.

9. The apparatus as defined in claim 8, wherein:
    focusing means provided at said video camera;
    said focusing means being connected with said focus control unit; and
    said focus control unit driving said focusing means as long as said mean brightness of said predetermined image frame does not remain constant within a maximum value during further operation of said focusing means.

10. The apparatus as defined in claim 1, further including:
    computer means connected to said image control unit;
    a manipulator unit connected to said computer means and said video camera;
    said manipulator unit containing a platform at which said video camera is mounted; and
    said platform being adjustable under the action of control signals generated by said computer means for directing said video camera to said predeterminate object.

11. The apparatus as defined in claim 10, wherein:
    said object constitutes a target; and
    said platform constitutes a target tracking platform.

12. The apparatus as defined in claim 1, further including:
    computer means connected to said image control unit;
    a manipulator unit connected to said computer means;
    said manipulator unit being selectively connected to either one of (i) an industrial robot or (ii) a machine tool;
    said video camera selectively monitoring either one of (i) the manipulation of a workpiece by means of said industrial robot or (ii) the operation of a tool upon a workpiece by means of said machine tool; and
    said computer means generating, as a result of the image data received from said image control unit, control signals for selectively controlling the operation of either one of (i) said industrial robot or (ii) said machine tool.

13. The apparatus as defined in claim 1, wherein:
    said video camera constitutes a forward looking infrared camera.

14. A method of automatically and passively focusing a video camera with respect to a predeterminate object, comprising the steps of:
   forming a predetermined image frame containing an image of the predeterminate object in an image area of the video camera;
   determining a mean brightness of the predetermined image frame containing said image of said predeterminate object; and
   focusing said video camera with respect to said predeterminate object in response to the determination of said mean brightness of said predetermined image frame containing said image of said predeterminate object.

15. The method as defined in claim 14, wherein:
   said step of forming said predetermined image frame entails fading-in into said imaging area of said video camera a predetermined image frame enclosing a predetermined imaging area section containing said image of said predeterminate object.

16. The method as defined in claim 14, wherein:
   said step of focusing said video camera with respect to said predeterminate object as a function of said mean brightness of said predetermined image frame entails focusing said video camera with respect to obtaining an extreme value of said mean brightness of said predetermined image frame.

17. The method as defined in claim 16, wherein:
   said step of focusing said video camera with respect to obtaining said extreme value of said mean brightness of said predetermined image frame entails focusing said video camera with respect to obtaining a maximum value for said mean brightness of said predetermined image frame.

18. The method as defined in claim 14, further including the steps of:
   reproducing at least part of the image produced by said video camera and containing said predetermined image frame; and
   manually positioning said predetermined image frame with respect to said image of said predeterminate object.

19. The method as defined in claim 14, further including the steps of:
   reproducing at least part of the image produced by said video camera and containing said predetermined image frame; and
   automatically positioning said predetermined image frame with respect to said image of said predeterminate object.

20. The method as defined in claim 14, further including the steps of:
   reproducing at least part of the image produced by said video camera and containing said predetermined image frame; and
   manually adjusting the size of said predetermined image frame.

21. The method as defined in claim 14, further including the steps of:
   reproducing at least part of the image produced by said video camera and containing said predetermined image frame; and
   automatically adjusting the size of said predetermined image frame.

22. The method as defined in claim 14, further including the steps of:
   determining the contrast between said image of said predeterminate object and the image of the background associated with said predeterminate object; and
   alternatingly optimizing said contrast of said image produced by said video camera and focusing said video camera with respect to said predeterminate object.

23. The method as defined in claim 14, further including the steps of:
   operating said video camera in conjunction with an industrial robot; and
   during said step of forming said predetermined image frame containing said image of the predeterminate object, selectively imaging, as said predeterminate object, either one of (i) a workpiece manipulated by said industrial robot or (ii) a tool of a machine tool operating upon a workpiece.

24. The method as defined in claim 14, further including the steps of:
   mounting said video camera on an adjustable platform; and
   during said step of forming said predetermined image frame containing said image of the predeterminate object, imaging, as said predeterminate object, a target and tracking said target by means of said video camera mounted on said adjustable platform.

* * * * *

UNITED STATES PATENT AND TRADEMARK OFFICE
CERTIFICATE OF CORRECTION

PATENT NO. : 5,016,110

DATED : May 14, 1991

INVENTOR(S) : A. Vuichard et al

It is certified that error appears in the above-indentified patent and that said Letters Patent is hereby corrected as shown below:

```
The drawing sheets, consisting of figs. 1-5 should be deleted and
replaced with the drawing sheets consisting of figs. 1-5 as shown
on the attached pages.
```

Signed and Sealed this

Eleventh Day of October, 1994

Attest:

BRUCE LEHMAN

Attesting Officer

Commissioner of Patents and Trademarks

United States Patent [19]

Vuichard et al.

[11] Patent Number: 5,016,110

[45] Date of Patent: May 14, 1991

[54] AUTOMATIC FOCUSING CONTROL OF A VIDEO CAMERA FOR INDUSTRIAL AND MILITARY PURPOSES

[75] Inventors: Albin Vuichard, Mollis; Bruno Bühler, Stadel; Tell Cavin, Uster, all of Switzerland

[73] Assignee: Oerlikon-Contraves AG, Zurich, Switzerland

[21] Appl. No.: 380,970

[22] Filed: Jul. 17, 1989

[30] Foreign Application Priority Data

Jul. 28, 1988 [CH] Switzerland .................. 02859/88

[51] Int. Cl.⁵ .................................... H04N 5/232
[52] U.S. Cl. .......................................... 358/227
[58] Field of Search ............... 358/227, 228, 209; 354/402, 406, 407

[56] References Cited

U.S. PATENT DOCUMENTS 4,609,944  9/1986  Nakada et al. ............... 358/227
4,660,092  4/1988  Nutting ....................... 358/224

FOREIGN PATENT DOCUMENTS 0263510  4/1988  European Pat. Off.

OTHER PUBLICATIONS

I. Plander, "Trends in the Development of Sensor Systems and Their Use in Some Technological Areas", published in ROBOTICS, vol. 3, No. 2, pp. 157 to 165, published by Elsevier Science publishers, B.V. Amsterdam, Jun. 1987.

Research Disclosure entitled "Brightness-Dependent Focusing Aid for a Manually Focused Video Camera", published in Research Disclosure, No. 288, pp. 215 to 217, Apr. 1988.

Primary Examiner—Stephen Brinich
Attorney, Agent, or Firm—Sandler, Greenblum, & Bernstein

[57] ABSTRACT

A video camera is used for controlling the adjustment of a manipulator unit. An object is imaged by the video camera which is optimumly focused with respect to the object as a function of the mean brightness of a predetermined image from containing the image of the object. The focusing operation is carried out on the basis of obtaining an optimum value for the mean brightness of the image elements within the predetermined image frame enclosing the object image. The manipulator unit may contain an industrial robot for selectively adjusting either one of a workpiece or a tool acting upon a workpiece. Furthermore, the manipulator unit may contain a target tracking platform for tracking a target constituting the object imaged by the video camera.

24 Claims, 3 Drawing Sheets